United States Patent
Einhart et al.

(10) Patent No.: US 6,777,127 B2
(45) Date of Patent: Aug. 17, 2004

(54) SYSTEMS, APPARATUS AND METHODS FOR BONDING AND/OR SEALING ELECTROCHEMICAL CELL ELEMENTS AND ASSEMBLIES

(75) Inventors: Johann Einhart, Uhldingen-Mühlhofen (DE); Stefan Reiff, Kirchheim (DE); Rudolf F. Bindel, Waiblingen (DE); Hubert Ryssel, Esslingen (DE); Christopher Todd Kirby, Burlington (CA); Francisco Enrique Rivera Diaz, North Vancouver (CA); Michael Medina, Vancouver (CA)

(73) Assignee: Ballard Power Systems Inc. (CA)

( * ) Notice: Subject to any disclaimer, the term of this patent is extended or adjusted under 35 U.S.C. 154(b) by 391 days.

(21) Appl. No.: 09/888,074

(22) Filed: Jun. 22, 2001

(65) Prior Publication Data

US 2002/0197519 A1 Dec. 26, 2002

(51) Int. Cl.⁷ .................................................. H01M 8/02
(52) U.S. Cl. ........................... 429/35; 429/34; 429/36; 429/185; 29/623.2; 29/623.4
(58) Field of Search .............................. 429/34, 35, 36, 429/37, 38, 39, 163, 164, 171, 185, 30, 40, 42; 29/623.2, 623.4; 427/10; 118/406, 428, 500, 665

(56) References Cited

U.S. PATENT DOCUMENTS

| | | | |
|---|---|---|---|
| 4,397,917 A | 8/1983 | Chi et al. | 429/26 |
| 4,505,992 A | 3/1985 | Dettling et al. | 429/36 |
| 4,588,660 A | 5/1986 | Shimizu et al. | 429/35 |
| 4,732,637 A | 3/1988 | Dettling et al. | 156/295 |
| 4,755,429 A | 7/1988 | Nickols et al. | 428/408 |
| 4,756,981 A | 7/1988 | Breault et al. | 429/36 |
| 4,786,568 A | 11/1988 | Elmore et al. | 429/44 |

(List continued on next page.)

FOREIGN PATENT DOCUMENTS

| | | |
|---|---|---|
| DE | 1 964 811 | 7/1971 |
| DE | 43 09 976 A1 | 9/1994 |
| DE | 43 14 745 C1 | 12/1994 |
| DE | 44 42 285 C1 | 2/1996 |
| DE | 195 42 475 A1 | 5/1997 |
| EP | 0 083 937 A1 | 7/1983 |
| EP | 0 122 150 B1 | 10/1984 |
| EP | 0 331 128 A2 | 9/1989 |
| EP | 0 604 683 A1 | 7/1994 |
| GB | 2 344 312 A | 6/2000 |
| JP | 7024917 | 1/1995 |
| JP | 7235314 | 9/1995 |
| WO | WO 94/09520 | 4/1994 |

*Primary Examiner*—Bruce F. Bell
*Assistant Examiner*—Monique Wills
(74) *Attorney, Agent, or Firm*—Seed IP Law Group PLLC

(57) ABSTRACT

Apparatus, systems, and methods for bonding one element of an electrochemical cell or cell stack to another wherein a sealing grove with a complex cross-sectional shape receives and retains a bead of adhesive prior to being assembled. The complex cross-sectional shape has a raised portion sized to receive and retain the bead of adhesive, and at least one depressed portion to receive adhesive displaced from the raised portion during assembly. Embodiments of the invention incorporate raised portions with straight, beveled, curved, and rough surfaces to increase the strength of the bond between the respective elements.

36 Claims, 3 Drawing Sheets

U.S. PATENT DOCUMENTS

| | | | |
|---|---|---|---|
| 5,021,284 A | 6/1991 | Miwa et al. | 428/166 |
| 5,176,966 A | 1/1993 | Epp et al. | 429/26 |
| 5,187,025 A | 2/1993 | Kelland et al. | 429/33 |
| 5,230,966 A | 7/1993 | Voss et al. | 429/26 |
| 5,264,299 A | 11/1993 | Krasij et al. | 429/30 |
| 5,284,718 A | 2/1994 | Chow et al. | 429/26 |
| 5,350,643 A | 9/1994 | Imahashi et al. | 429/33 |
| 5,393,619 A | 2/1995 | Mayer et al. | 429/152 |
| 5,523,175 A | 6/1996 | Beal et al. | 429/30 |
| 5,733,678 A | 3/1998 | Ledjeff et al. | 429/30 |
| 5,807,606 A | 9/1998 | Mould et al. | 427/10 |
| 5,858,569 A | 1/1999 | Meacher et al. | 429/26 |
| 6,057,054 A | 5/2000 | Barton et al. | 429/42 |
| 6,066,409 A | 5/2000 | Ronne et al. | 429/39 |
| 6,080,503 A | 6/2000 | Schmid et al. | 429/35 |
| 6,098,257 A | 8/2000 | Koido et al. | 29/25.35 |
| 2001/0019790 A1 * | 9/2001 | Regan et al. | 429/35 |
| 2002/0064703 A1 * | 5/2002 | Mizuno | |

\* cited by examiner

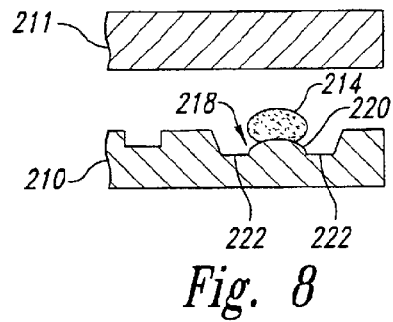
Fig. 8
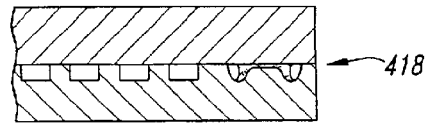
Fig. 11
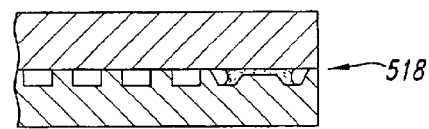
Fig. 12
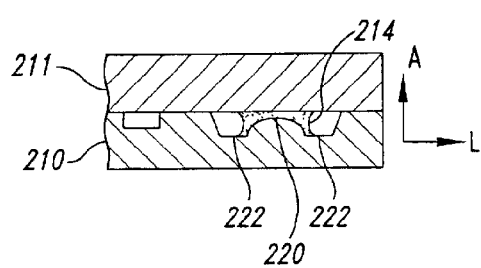
Fig. 9
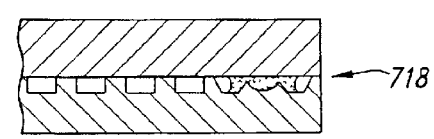
Fig. 13
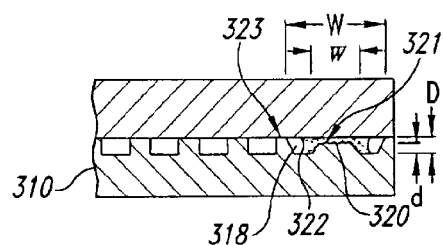
Fig. 10
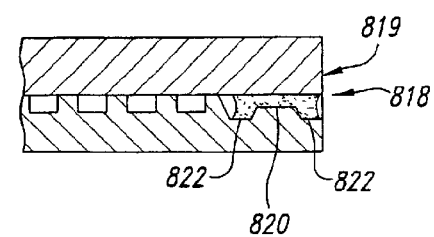
Fig. 14
Fig. 15

SYSTEMS, APPARATUS AND METHODS FOR BONDING AND/OR SEALING ELECTROCHEMICAL CELL ELEMENTS AND ASSEMBLIES

TECHNICAL FIELD

The present invention relates to electrochemical energy converters with polymer electrolyte membranes, such as fuel cells or electrolyzer cells or stacks of such cells, wherein the cells or stacks comprise adhesively bonded and/or sealed layers.

BACKGROUND OF THE INVENTION

Electrochemical cells comprising solid polymer electrolyte membranes may be operated as fuel cells wherein a fuel and an oxidant are electrochemically converted at the cell electrodes to produce electrical power, or as electrolyzers wherein an external electrical current is passed between the cell electrodes, typically through water, resulting in generation of hydrogen and oxygen at the respective electrodes. FIGS. 1–4 collectively illustrate typical designs of a conventional MEA 5, electrochemical cell 10 comprising a PEM layer 2, and a stack 100 of such cells.

Each cell 10 comprises a membrane electrode assembly ("MEA") 5 such as that illustrated in an exploded view in FIG. 1. MEA 5 comprises an ion exchange membrane layer 2 interposed between first and second electrode layers 1 and 3, respectively, which are typically porous and electrically conductive, and each of which comprises an electrocatalyst at its interface with the ion exchange membrane layer 2 for promoting the desired electrochemical reaction. The electrocatalyst generally defines the electrochemically active area of the cell. The MEA 5 is typically consolidated as a bonded laminated assembly.

In an individual cell 10, illustrated in an exploded view in FIG. 2, an MEA 5 is interposed between first and second cell separator plates 11 and 12, respectively, which are typically fluid impermeable and electrically conductive. The cell separator plates 11, 12 are typically manufactured from non-metals, such as graphite; from metals, such as certain grades of steel or surface treated metals; or from electrically conductive plastic composite materials.

Fluid flow spaces, such as passages or chambers, are provided between the cell separator plates 11, 12 and the adjacent electrode layers 1, 3 to facilitate access of reactants to the electrode layers and removal of products. Such spaces may, for example, be provided by and the porous structure of the corresponding electrode layers 1, 3. More commonly channels are formed in the adjoining faces of the cell separator plates 11, 12, the electrode layers 1, 3, or both. Cell separator plates 11, 12 comprising such channels are commonly referred to as fluid flow field plates. Resilient gaskets or seals are typically provided around the perimeter of the flow fields between the faces of the MEA 5 and each of the cell separator plates 11, 12 to prevent leakage of fluid reactant and product streams.

Electrochemical cells 10 with ion exchange membrane layers 2 are advantageously stacked to form a stack 100 (see FIG. 4) comprising a plurality of cells disposed between first and second end plates 17, 18. A compression mechanism is typically employed to hold the cells 10 tightly together, to maintain good electrical contact between components, and to compress the seals. In the embodiment illustrated in FIG. 3, each cell 10 comprises a pair of cell separator plates 11, 12, and an MEA 5 interposed therebetween. An alternative configuration has a single separator plate or "bipolar plate" interposed between pairs of MEAs 5, contacting the cathode of one cell and the anode of the adjacent cell (except for the end cells). The stack 100 may comprise cooling layers interposed between every few cells 10 of the stack, or between each adjacent pair of cells. The cooling layers may be formed within the cell separator plates, for example, or they may comprise channels in bipolar plates used in the stack. Cooling layers of the latter type are disclosed in commonly assigned U.S. Pat. No. 5,230,966.

The illustrated cell elements have openings 30 formed therein which, in the stacked assembly, align to form fluid manifolds for supply and exhaust of reactants and products and, if cooling spaces are provided, for a cooling medium. Again, resilient gaskets or seals are typically provided between the faces of the MEA 5 and each of the cell separator plates 11, 12 around the perimeter of these fluid manifold openings 30 to prevent leakage and intermixing of fluid streams in the operating stack 100.

SUMMARY OF THE INVENTION

The present invention relates to apparatus, systems and methods for use in bonding one element of an electrochemical cell stack to another element in the stack and/or for sealing portions of the stack, such as the perimeter of a manifold opening in a cell separator plate. In one embodiment, the inventive method comprises providing a sealing surface on a first element of the stack with a complex groove having a raised portion and a depressed portion. Both the raised portion and the depressed portion lie below the plane of the sealing surface, but the depressed portion is further from the plane than the raised portion. The method then comprises depositing a bead of adhesive on the raised portion, such as by screen printing. When deposited, the bead projects above the plane of the sealing surface. The method then comprises abutting a second element of the stack against the first element. When the first and second elements of the stack are abutted, the adhesive is displaced in part from the raised portion of complex groove, and a portion of the bead of adhesive is received within the depressed portion of the groove.

In another embodiment, the method comprises providing a complex groove having a single raised portion positioned between two depressed portions. The raised portion is again configured to receive the bead of adhesive. When the first element of the stack is abutted with the second element, however, a portion of the bead of adhesive is displaced into each of the two depressed portions.

The present invention is also directed toward an electrochemical cell comprising a membrane electrode assembly positioned between first and second bodies, such as cell separator plates. The second body has a sealing groove with a complex cross-sectional shape. The sealing groove has a shallow portion that is wide enough to receive the volume of adhesive, and a deep portion configured to receive a portion of the adhesive that is displaced during assembly.

In another embodiment, the shallow portion of the sealing groove is curved to increase the strength of the bond between the first body and the second body. The curved shallow portion of the sealing groove is still wide enough to receive the bead of adhesive. Upon assembly, however, the bead is displaced along the entire width of the curved shallow portion. As a result, the bond between the first and second bodies is strengthened to better resist tension and shear.

BRIEF DESCRIPTION OF THE DRAWINGS

FIG. 8 is a cross-sectional elevation view of a cell separator plate, a membrane electrode assembly, and a bead of adhesive prior to assembly according to one embodiment of the present invention.

FIG. 9 is a cross-sectional elevation view of the cell separator plate, membrane electrode assembly, and adhesive of FIG. 8 following assembly according to one embodiment of the present invention.

FIGS. 10–15 are cross-sectional elevation views of portions of a pair of cell separator plates according to various embodiments of the present invention.

DETAILED DESCRIPTION OF THE ILLUSTRATED EMBODIMENTS

The present invention is generally directed toward methods, systems and apparatus for use in electrochemical cells, such as fuel cells. Embodiments of the present invention may allow portions of the fuel cell to be sealed while providing a stronger bond between the respective portions of the cell. Many specific details of certain embodiments of the invention are set forth in the following description and in FIGS. 5–15 to provide a thorough understanding of such embodiments. One skilled in the art, however, will understand that the present invention may have additional embodiments, or may be practiced without several of the details described in the following description.

Figure 1:
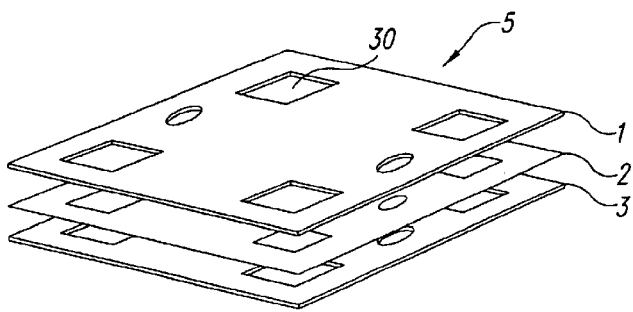
FIG. 1 is an exploded isometric view of a membrane electrode assembly according to the prior art.
Figure 2:
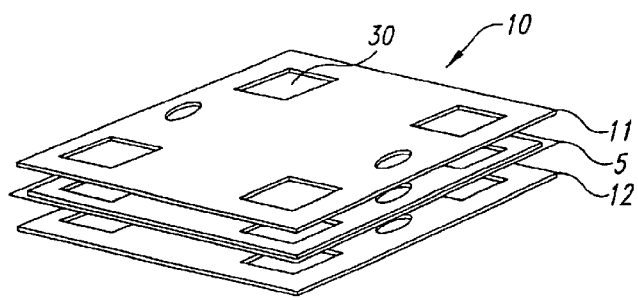
FIG. 2 is an exploded isometric view of an electrochemical cell according to the prior art.
Figure 3:
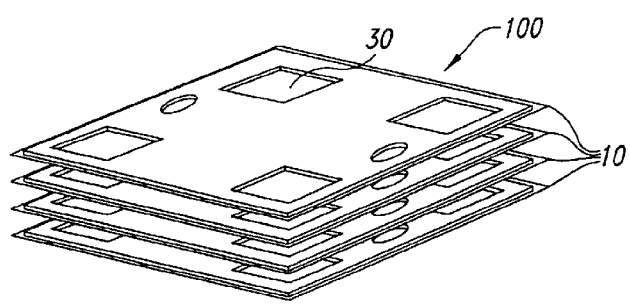
FIG. 3 is an exploded isometric view of an electrochemical cell stack according to the prior art.
Figure 4:
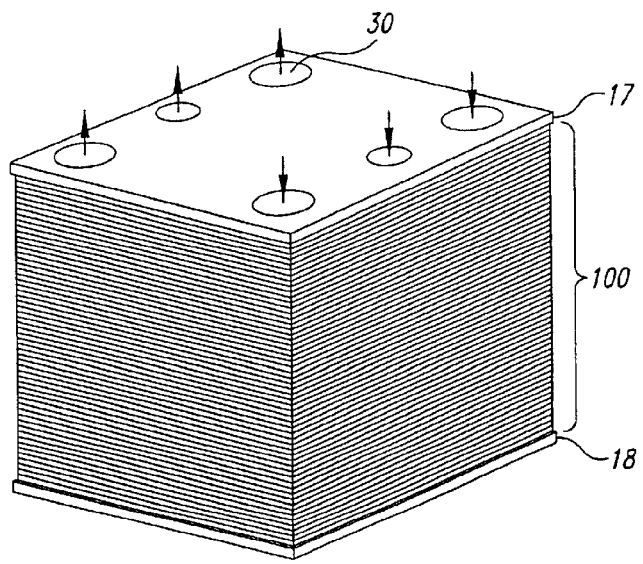
FIG. 4 is an isometric view of an electrochemical cell stack according to the prior art.
Figure 5:
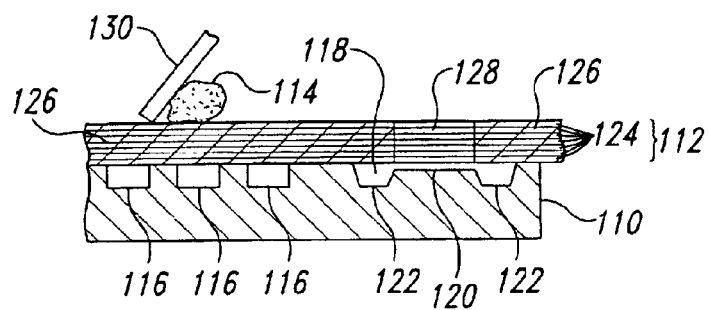
FIGS. 5–7 are cross-sectional elevation views of a portion of a cell separator plate, a screen mask and a squeegee, illustrating different steps in a screen printing process according to one embodiment of the present invention.
Figure 6:
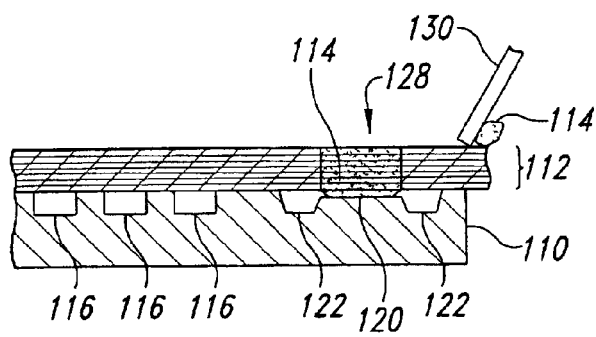
Figure 7:
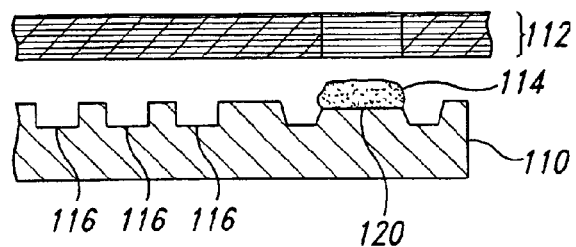

FIGS. 5–7 illustrate a cell separator plate 110 and a screen mask 112 being used to apply an adhesive 114 to the cell separator plate prior to assembly of an electrochemical cell or cell stack. In the illustrated embodiment, the cell separator plate 110 comprises a number of flow channels 116 for ultimately channeling coolant, fuel or oxidant to a membrane electrode assembly (not shown) or an adjacent cell separator plate. The cell separator plate 110 also has a sealing groove 118 used to bond the cell separator plate to an adjacent element in the cell or cell stack, and/or to seal a portion of the cell from other portions of the cell, from other portions of the stack, or from the external environment.

In the illustrated embodiment, the sealing groove 118 incorporates a raised central portion 120 and a pair of opposing depressed portions 122. The raised central portion is sufficiently wide to receive and retain a bead of adhesive, as discussed below.

The screen mask 112 of the illustrated embodiment can be fabricated from screen 124 and mask layers 125. Screen 124 may comprise a stainless steel or polymer mesh with a 71% open area, although it is appreciated that other materials or porosities would be interchangable, as understood in the art. Similarly, more or fewer mask layers can be used without departing from the spirit of the invention. Screen mask 112 has one or more masked portions 126 and an open portion 128. The open portions 128 are aligned with the raised central portion 120 of the sealing groove 118. Applicant understands that a single screen can also be used, as generally understood in the art.

In FIG. 5, a mass of adhesive 114 is positioned against the screen mask 112, and a squeegee 130 is positioned against the adhesive and moving the adhesive along the screen mask. The illustrated adhesive is an epoxy. Applicant appreciates that many other adhesives may also work, as generally understood in the art. In FIG. 6, the squeegee 130 has moved the adhesive 114 past the open portion 128 of the screen mask 112, and a portion of the adhesive 114 has filled the open portion of the screen mask. Alternatively, a two-squeegee process may be employed, wherein the first squeegee places the adhesive onto the screen mask and the second squeegee pushes the adhesive into the open portions thereof. The adhesive 114 within the open portion 128 of the screen mask 112 may contact the raised central portion 120 of the sealing groove 118. Thus, as illustrated in FIG. 7, when the screen mask 112 is raised away from the cell separator plate 110, the adhesive 114 remains on the raised central portion 120. In the illustrated embodiment, the bead of adhesive 114 ranges from 1.3–1.5 mm (0.050–0.060 inches) wide, although this width, as well as the corresponding width of the raised central portion 120, can vary.

The above-described screen printing process can be used to apply a bead of adhesive to a cell separator plate or other elements of an electrochemical cell or cell stack. The cell separator plate 110 carrying the adhesive 114 can subsequently be bonded to another separate cell separator plate, a membrane electrode assembly, an end plate or any other element in the electrochemical cell or cell stack assembly. For example, cell separator plates may be bonded together to form coolant channels at their interface. Applicant appreciates that the bead of adhesive could be applied to the mating surface of the element to be bonded, such that the raised central portion 120 of the sealing groove 118 receives the bead of adhesive as the elements are brought into contact. Likewise, the bead of adhesive can be applied through any other means known in the art, such as via an automated nozzle or other system.

The sealing groove 118 can circumscribe a manifold hole, such as a hole through which air, fuel or cooling fluid flows, or can circumscribe a flow field or a membrane electrode assembly. As a result, the shape and path of the sealing groove is not considered to be essential to the present invention.

FIG. 8 illustrates a cell separator plate 210 and an electrode 211 from a membrane electrode assembly, according to another embodiment of the present invention. In this embodiment, the raised central portion 220 of the sealing groove 218 has a convex cross-sectional shape. The raised central portion 220 is sufficiently wide to support the entire bead of adhesive 214. As illustrated in FIG. 9, after assembly the adhesive 214 is distributed along the entire raised central portion 220, and extends into the opposing depressed portions 222. The size of the bead of adhesive 214 is preselected such that the depressed portions 222 are partially filled with adhesive upon assembly. Because portions of the raised central portion 220 face in various directions, the bond between the adhesive and the raised central portion resists separation of the plates 210, 211 in both the axial direction A and the lateral direction L. The bond between the cell separator plates 210, 211 is strengthened not only in an axial direction A but also in a lateral direction L, as well as along all positive and negative vector combinations thereof.

Embodiments of the present invention have numerous advantages over the prior art. For example, the raised central portion of the sealing groove places the adhesive closer to the mating object, increasing the likelihood of a successful bond. The raised central portion also allows for the use of a smaller bead of adhesive. Using less adhesive reduces the risk of unwanted overflow, wherein adhesive between the mating surfaces prevents perfect mating. In the illustrated embodiment, because two depressed portions are positioned adjacent the raised central portion, one on each side thereof, it is highly unlikely that adhesive will leak from the sealing groove and interfere with the mating surfaces. As discussed above, a known quantity of adhesive is used that fills only a portion of each depressed groove. As a result, even with a margin of error, there is an available volume remaining in which adhesive can be displaced before it contacts the mating surface. Also, as discussed above, the contours on the raised central portion can increase the strength of the bond between the mating surfaces.

FIGS. 10–15 illustrate some of the many variations that can be made to the sealing groove as understood by the inventors. Many of these embodiments illustrate small changes. The inventors realize, however, that these small changes can be combined in many different ways to form even more variations. The inventors also realize that other modifications can be made without deviating from the spirit of the invention.

FIG. 10 illustrates a sealing groove 318 according to another embodiment of the present invention. In this embodiment, the raised central portion 320 has an upper surface 321 that has been treated to increase the surface's roughness. As a result, the upper surface 321 has an anchor pattern that further increases the bond between the adhesive and the raised central portion 320 of the sealing groove 318.

In some embodiments, the sealing groove 318 may have an outer width W that ranges from 1.0–2.0 mm (0.040–0.080 inches), with the illustrated embodiment measuring 1.5 mm (0.060 inches). The raised central portion may have an inner width w that measures between 0.25–1.3 mm (0.010–0.050 inches), with the illustrated embodiment measuring 1.0 mm (0.040 inches). The raised central portion may have a depth d below a mating surface 323 of the cell separator plate 310 measuring approximately 25–130 $\mu$m (0.001–0.005 inches), with the illustrated embodiment measuring 50 $\mu$m (0.002 inches). The depressed portions 322 may have a depth D below the mating surface 323 measuring approximately 130–630 $\mu$m (0.005–0.025 inches), with the illustrated embodiment measuring 200 $\mu$m (0.008 inches).

FIGS. 11–14 illustrate four variations of sealing grooves 418, 518, 618, and 718, respectively, according to alternate embodiments of the present invention. They collectively illustrate that the sealing groove can have rounded edges, beveled edges, concave surfaces and triangular grooves, in addition to the other features previously illustrated.

FIG. 15 illustrates a sealing groove 818 according to yet another embodiment of the present invention. In this particular embodiment, the sealing groove abuts an edge surface 819 of the electrochemical cell. Consequently, the depressed portion 822 closest to the edge surface 819 does not have an outer wall, but instead opens to the exterior environment. Adhesive positioned on the central raised finger 820 nonetheless is displaced into both of the depressed portions 822, as with the prior embodiments.

From the foregoing it will be appreciated that, all the specific embodiments of the invention have been described herein for purposes of illustration, various modifications may be made without deviating from the spirit and scope of the invention. Accordingly, the invention is not limited except as by the appended claims.

What is claimed is:

1. A method for bonding a first element of an electrochemical cell stack to a second element of the cell stack, the method comprising:

providing at least one complex groove in a first sealing surface of the first element of the electrochemical cell stack, the complex groove having at least one raised portion and at least one depressed portion, the at least one raised portion being located above the depressed portion, the at least one raised portion being configured to receive and retain a bead of adhesive;

depositing the bead of adhesive on the at least one raised portion of the at least one complex groove;

abutting a second sealing surface of the second element of the electrochemical cell stack against the first sealing surface of the first element of the electrochemical cell stack such that the second sealing surface displaces at least a portion of the bead of adhesive from the at least one raised portion of the complex groove; and receiving the portion of the bead of adhesive in the at least one depressed portion of the groove.

2. The method of claim 1 wherein the first and second elements are cell separator plates.

3. The method of claim 2 wherein the sealing surfaces of the separator plates cooperate to form coolant channels.

4. The method of claim 1 wherein the first element is a cell separator plate and the second element is an electrode.

5. The method of claim 1 wherein providing at least one complex groove comprises providing a complex groove having one raised portion and two depressed portions, the raised portion being positioned between the depressed portions.

6. The method of claim 1 wherein providing at least one complex groove comprises providing a complex groove having one raised portion and two depressed portions, the raised portion having a convex cross-section and being positioned between the depressed portions.

7. The method of claim 1 wherein depositing the bead of adhesive comprises screen printing the bead of adhesive onto the raised portion of the complex groove.

8. The method of claim 1 wherein depositing the bead of adhesive comprises screen printing the bead of adhesive onto the second sealing surface of the second element, and abutting the second sealing surface of the second element against the first sealing surface of the first element.

9. An electrochemical cell comprising:

a membrane electrode assembly having an ion exchange membrane interposed between first and second electrode layers;

a first body positioned on the first side of the membrane electrode assembly, the first body being configured to direct at least one of a fuel and an oxidant to at least a portion of the first electrode layer; and a second body positioned on the second side of the membrane electrode assembly, the second body being configured to direct the other of the fuel and the oxidant to at least a portion of the second electrode layer, a sealing surface of the second body having at least one sealing groove with a complex cross-sectional shape, a shallow portion of the cross-sectional shape being sufficiently wide to receive and retain a volume of adhesive prior to assembly of the electrochemical cell, and a deep portion of the, cross-sectional shape being configured to receive a portion of the volume of adhesive that is displaced from the shallow portion during assembly of the electrochemical cell, the deep portion being immediately adjacent the shallow portion.

10. The electrochemical cell of claim 9 wherein the at least one sealing groove is positioned on a surface of the second body facing away from the membrane electrode assembly.

11. The electrochemical cell of claim 9 wherein the at least one sealing groove comprises a plurality of sealing grooves.

12. The electrochemical cell of claim 9 wherein the shallow portion of the at least one sealing groove comprises a flat portion.

13. The electrochemical cell of claim 9 wherein the shallow portion of the at least one sealing groove comprises a surface that is rougher than the surrounding surfaces.

14. The electrochemical cell of claim 9 wherein the shallow portion of the at least one sealing groove comprises a flat portion oriented to be substantially aligned with a plane of the membrane electrode assembly.

15. The electrochemical cell of claim 9 wherein the shallow portion of the at least one sealing groove comprises a curved portion.

16. The electrochemical cell of claim 9 wherein the shallow portion of the at least one sealing groove comprises a convex curved portion.

17. The electrochemical cell of claim 9 wherein the shallow portion of the at least one sealing groove comprises a concave curved portion.

18. The electrochemical cell of claim 9 wherein the deep portion is a first deep portion, and further comprising a second deep portion.

19. The electrochemical cell of claim 9 wherein the deep portion is a first deep portion, and further comprising a second deep portion positioned on a side of the shallow portion opposite the first deep portion, the second deep portion being configured to receive a portion of the volume of adhesive that is displaced from the shallow portion of the at least one sealing groove during assembly of the electrochemical cell.

20. The electrochemical cell of claim 9 wherein the at least one sealing groove has a width measuring approximately 1.0–2.0 mm.

21. The electrochemical cell of claim 9 wherein the at least one sealing groove has a width measuring approximately 1.5 mm.

22. The electrochemical cell of claim 9 wherein the shallow portion of the at least one sealing groove has a width measuring approximately 0.3–1.3 mm.

23. The electrochemical cell of claim 9 wherein the shallow portion of the at least one sealing groove has a width measuring approximately 1.0 mm.

24. The electrochemical cell of claim 9 wherein the shallow portion of the at least one sealing groove has a depth below the sealing surface measuring approximately 25–130 $\mu$m.

25. The electrochemical cell of claim 9 wherein the shallow portion of the at least one sealing groove has a depth below the sealing surface measuring approximately 50 $\mu$m.

26. The electrochemical cell of claim 9 wherein the deep portion of the at least one sealing groove has a depth below the sealing surface measuring approximately 130–630 $\mu$m.

27. The electrochemical cell of claim 9 wherein the deep portion of the at least one sealing groove has a depth below the sealing surface measuring approximately 200 $\mu$m.

28. An electrochemical cell for use in combination with other electrochemical cells to form a cell stack, the electrochemical cell comprising:

a membrane electrode assembly having a membrane interposed between first and second electrode layers;

a first body positioned on the first side of the membrane electrode assembly, an inner surface of the first body abutting the membrane electrode assembly and being configured to direct at least one of a fuel and an oxidant to at least a portion of the first electrode; and a second body positioned on the second side of the membrane electrode assembly, an inner surface of the second body abutting the membrane electrode assembly and being configured to direct the other of the fuel and the oxidant to at least a portion of the second electrode, an outer surface of the second body having at least one sealing groove with a complex cross-sectional shape, a first portion of the at least one sealing groove being sufficiently wide to receive and retain a volume of adhesive prior to assembly of the cell stack, and a second portion of the at least one sealing groove being configured to receive a portion of the volume of adhesive that is displaced from the first portion of the at least one sealing groove during assembly of the cell stack, at least a portion of the second portion of the at least one sealing groove being spaced further from a plane of the outer surface of the second body than the first portion of the at least one sealing groove.

29. The electrochemical cell of claim 28 wherein an outer surface of the first body comprises a sealing portion positioned to align with the at least one sealing groove on a body of an adjacent electrochemical cell in the cell stack, the sealing portion being adapted to facilitate engagement with the adhesive.

30. The electrochemical cell of claim 28 wherein an outer surface of the first body comprises a sealing portion positioned to align with the at least one sealing groove on a body of an adjacent electrochemical cell in the cell stack, the sealing portion being substantially flat.

31. The electrochemical cell of claim 28 wherein an outer surface of the first body comprises a sealing portion positioned to align with the at least one sealing groove on a body of an adjacent electrochemical cell in the cell stack, the sealing portion being rougher than the surrounding surfaces.

32. The electrochemical cell of claim 28 wherein the first body further comprises a plurality of coolant channels.

33. The electrochemical cell of claim 28 wherein an outer surface of the first body further comprises a plurality of coolant grooves configured to abut the outer surface of a body of an adjacent electrochemical cell in the cell stack to form coolant channels therebetween, the at least one sealing groove being positioned to encircle the coolant grooves to retain a coolant fluid within the coolant channels during operation.

34. A plate for use in an electrochemical cell, comprising:

a sealing groove with a complex cross-sectional shape, a substantially rigid first portion of the sealing groove being sized and shaped to receive and retain a volume of adhesive prior to assembly of the electrochemical cell, and a second portion of the sealing groove being configured to receive a portion of the volume of adhesive that is displaced from the first portion of the sealing groove during assembly of the electrochemical cell.

35. The plate of claim 34 wherein the second portion of the sealing groove is deeper than the first portion of the sealing groove.

36. The plate of claim 34 wherein the second portion is located to one side of the first portion, and further comprising a third portion of the sealing groove, the third portion being located to an opposing other side of the first portion, the third portion being configured to receive a portion of the volume of adhesive that is displaced from the first portion of the sealing groove during assembly of the electrochemical cell.

* * * * *